May 26, 1953      H. M. RILEY ET AL      2,639,525
AUTOMATIC THREE-DIMENSIONAL DISPLAY DEVICE
Filed March 7, 1946      6 Sheets-Sheet 1
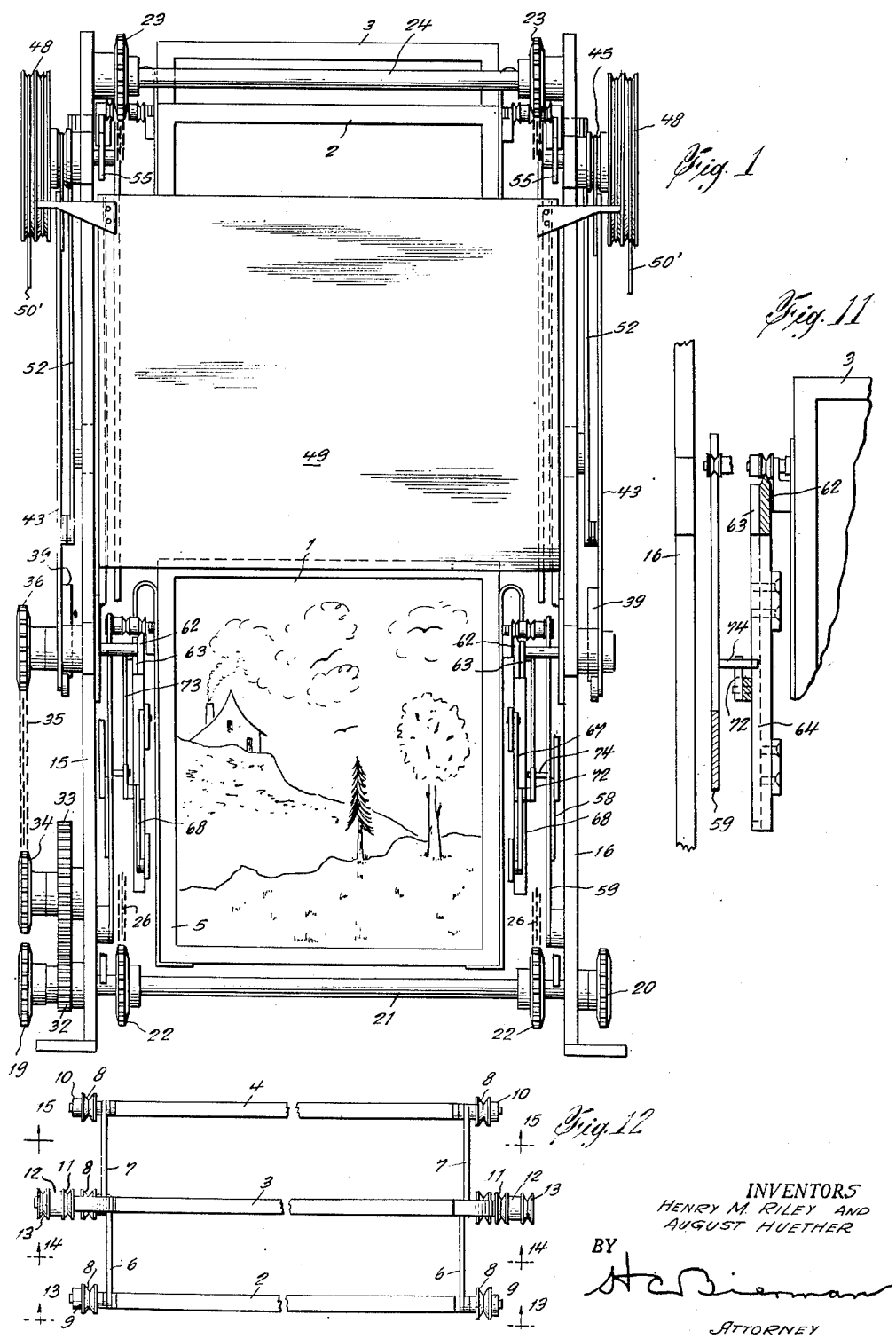
INVENTORS
HENRY M. RILEY AND
AUGUST HUETHER
BY
*H C Bierman*
ATTORNEY

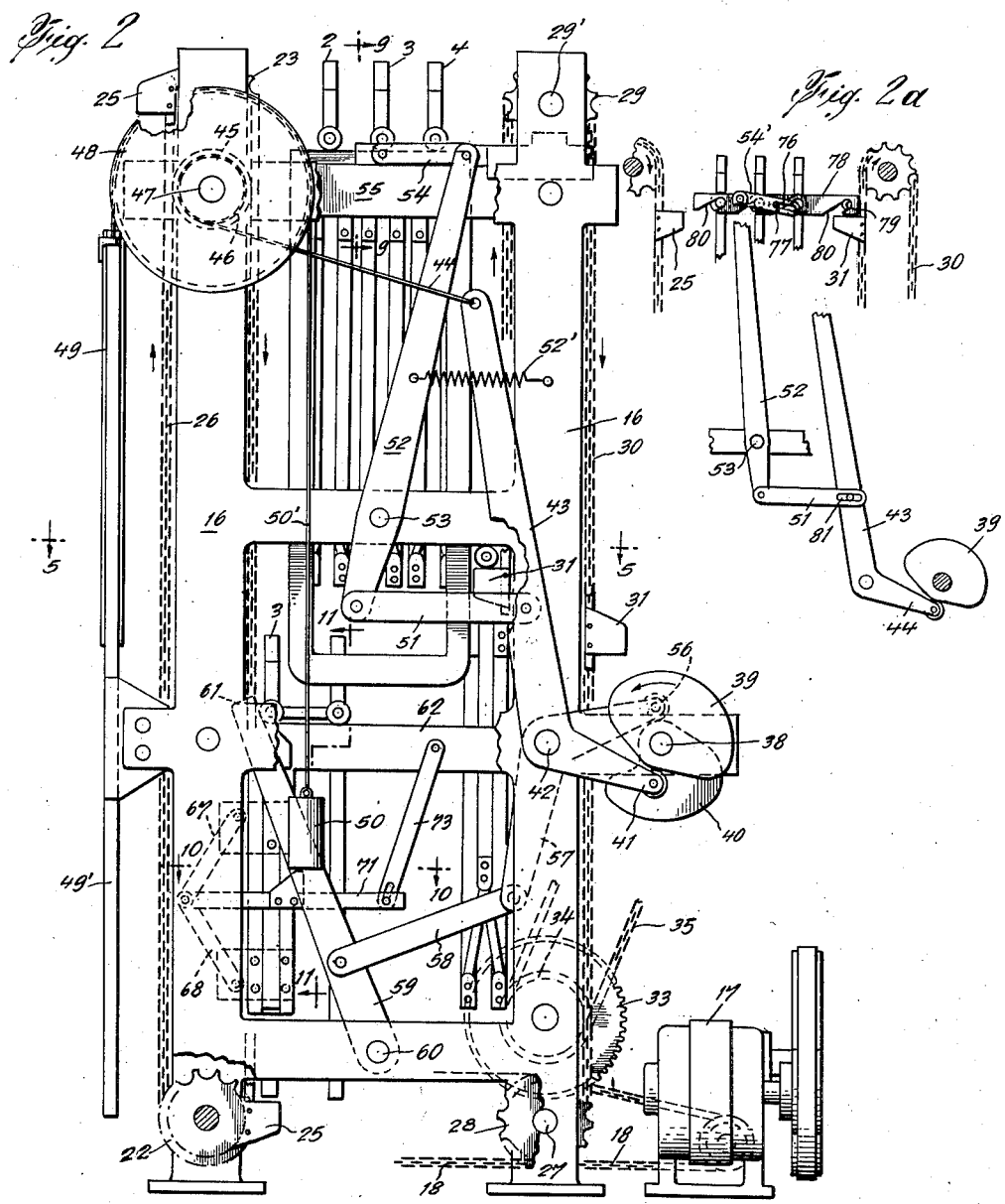

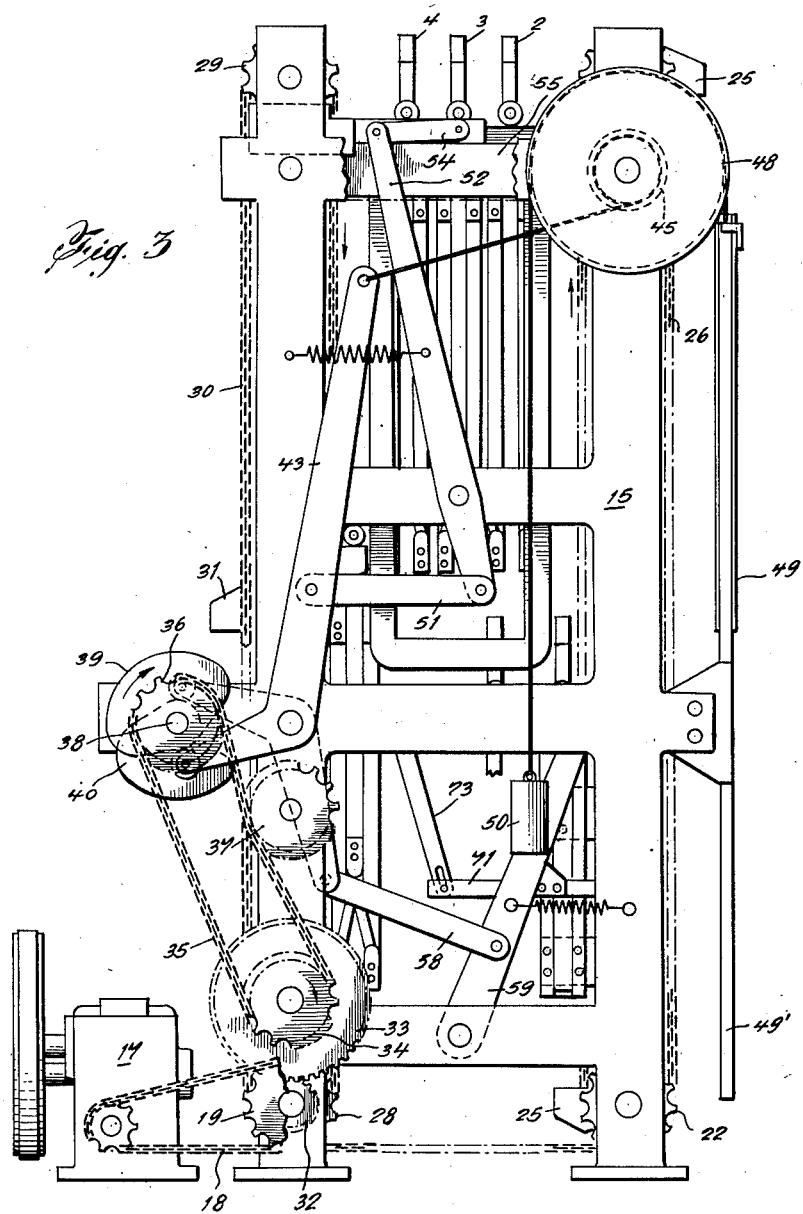

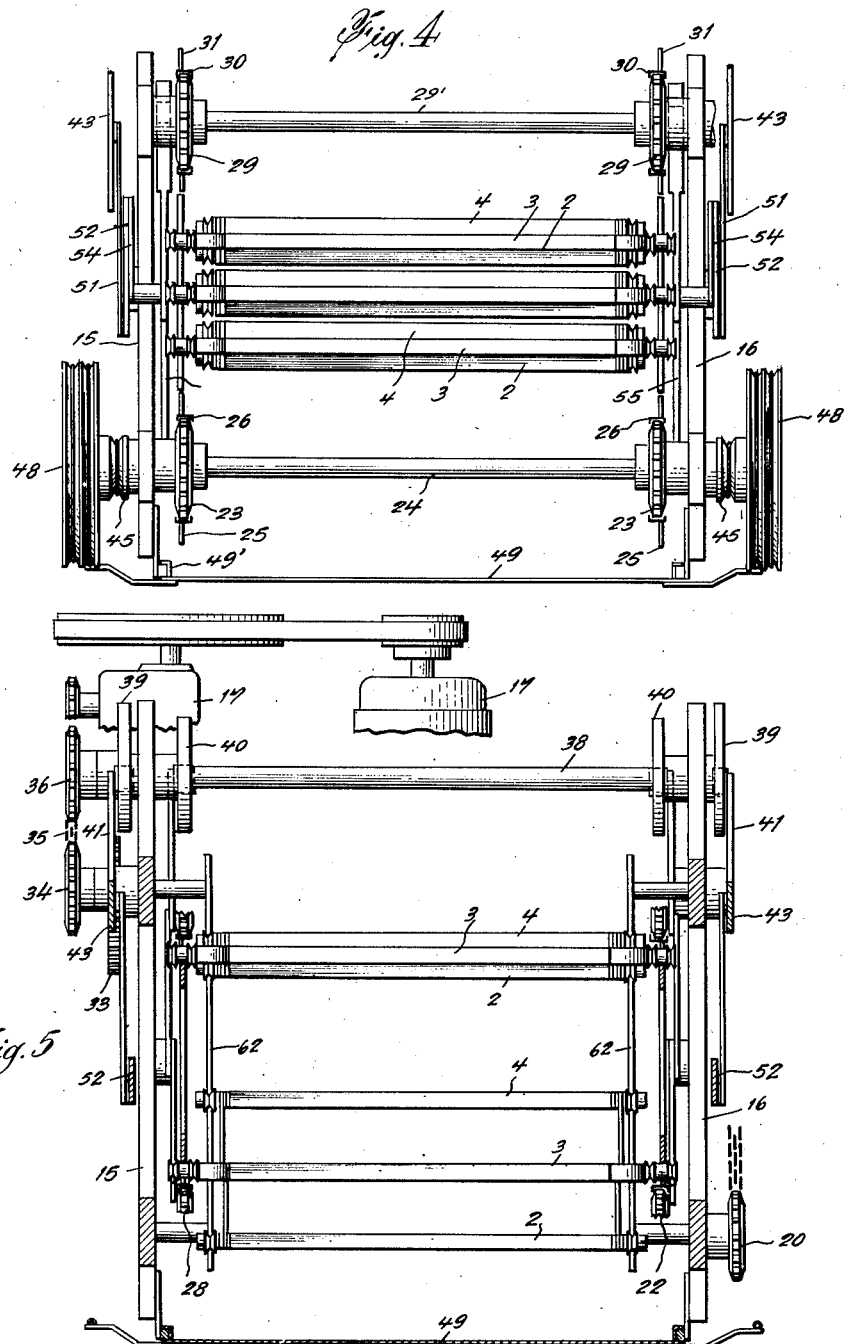

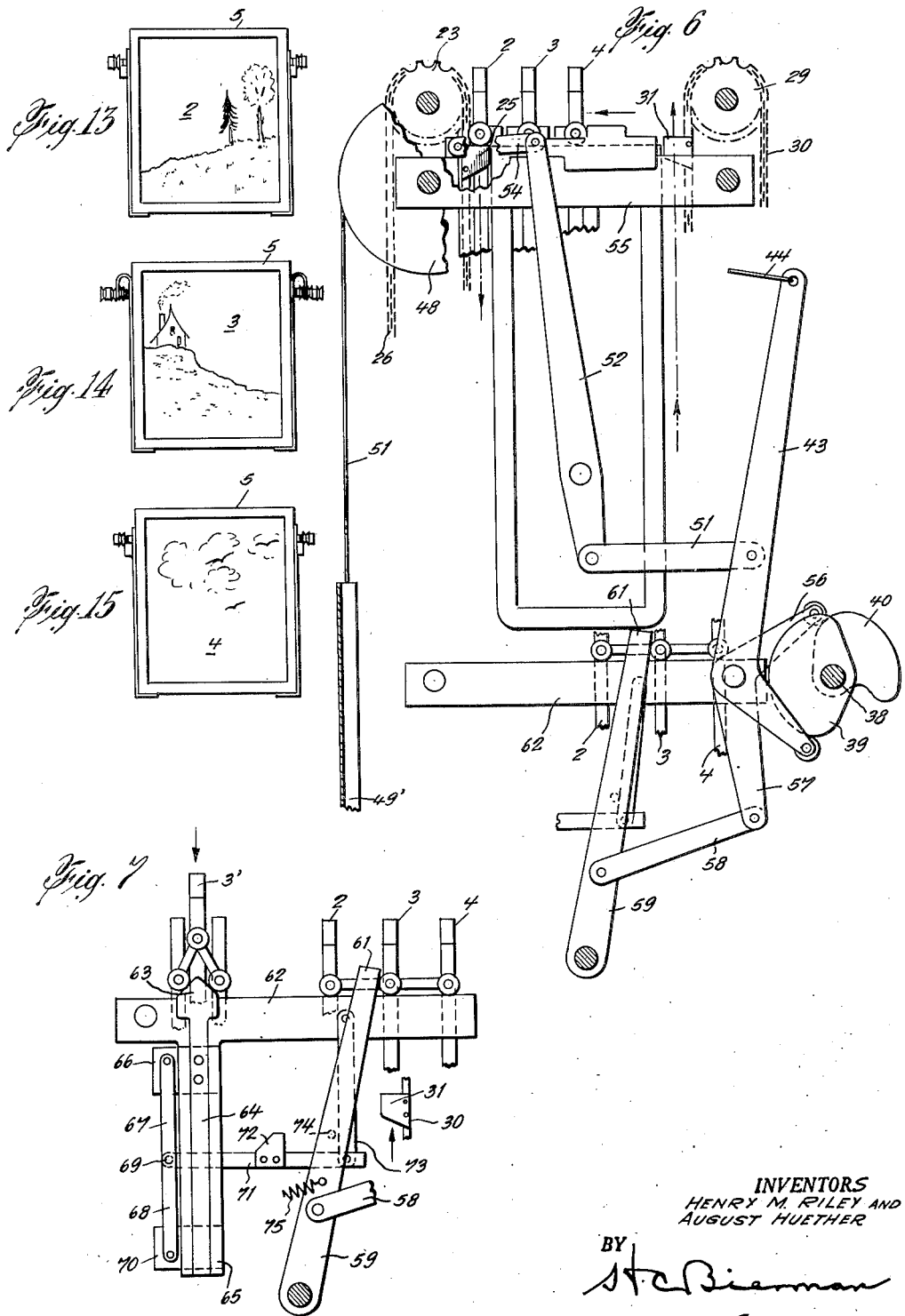

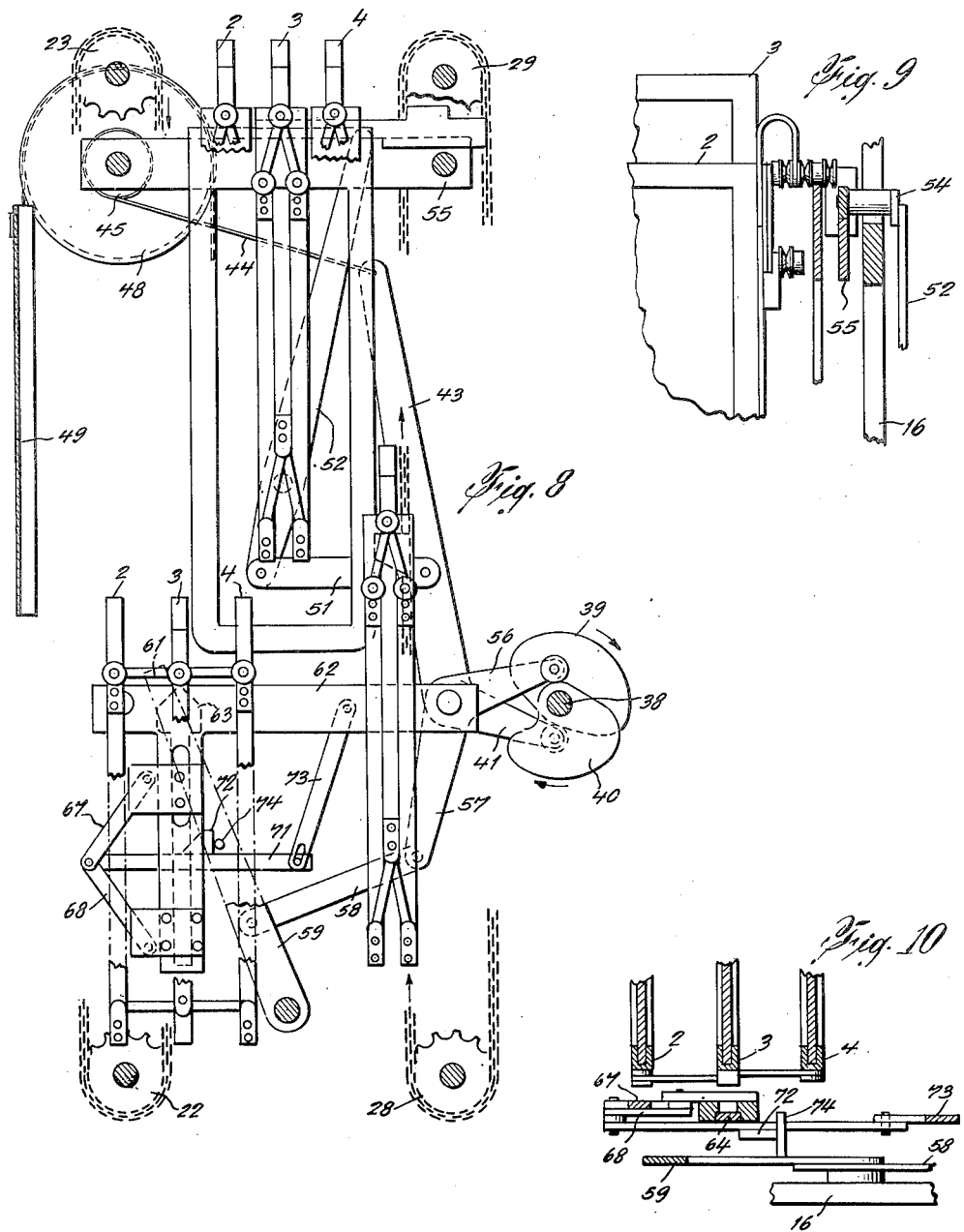

UNITED STATES PATENT OFFICE 2,639,525

AUTOMATIC THREE-DIMENSIONAL DISPLAY DEVICE

Henry M. Riley, Manhasset, and August Huether, Baldwin, N. Y.

Application March 7, 1946, Serial No. 652,728

6 Claims. (Cl. 40—36)

The present invention is directed to display devices, more particularly to a mechanical arrangement whereby a series of displays may be exhibited in a continual series.

In the prior patent of Henry M. Riley, No. 2,105,008, issued January 11, 1938, there was described and claimed a display device whereby depth of vision was obtained. The device consisted essentially of two or more transparent plates arranged in parallel, usually with a back scene, and containing on each plate certain decorations, all of which when viewed from the front, appeared to be a single picture. However, because of the spaced arrangement of the plates, a three dimensional effect was obtained and it was possible to display objects, such as birds in flight, which increased the life-like appearance of the pictures. Such a device has been used successfully in commerce but it has certain limitations. Principally, in many cases it is desired to show not a single view or picture but to exhibit a number of such pictures, one after another.

Therefore, the present invention has among its objects to improve upon the prior Patent No. 2,105,008, and to provide an arrangement whereby a plurality of pictures or views may be exhibited in series, mechanically and automatically.

It is also among the objects of the present invention to provide a simple and effective device whereby the display unit may be caused to move in a cycle at one point of which it is exhibited.

It is still further among the objects of the present invention to provide a display unit consisting of a plurality of parallel plates, usually with a back scene, having decorative effects thereon, which are spread apart during the exhibiting period, to give a three dimensional effect, and which may be collapsed or folded when in other stages of movement.

Another object of the invention is to provide a mechanism which can be shut down and one of the units shown continuously, for example, when repairs and the like are being made.

In practicing the present invention there is provided a display unit consisting of a series of transparent plates of glass, plastic, or the like, usually two or more, and a back scene, and mounted together by means of links so that by movement of said links the plates may be either extended or folded.

There is also provided a mechanism consisting essentially of a framework or support carrying the necessary elements for movement of said display unit. The mechanism consists essentially of a pair of carriages movable vertically, one of the carriages being designed to lower the display unit, and the other carriage to raise the same. There is also provided two pairs of tracks, the upper of which is intended to allow the display unit to rest thereon and to be moved forwardly in the machine. The lower pair of tracks provides means for supporting the display unit in its lower position and allows the same to be moved rearwardly, to be raised by the rear carriage.

The display unit is exhibited at the lower portion of the front of the machine and a movable curtain is provided so that after the period of exhibiting has been completed, the curtain moves down and obscures the display unit. The mechanism then moves the unit rearwardly on the lower track, the rear carriage lifts the same upwardly and deposits it on the upper track and the unit is then pushed forwardly. Also, the other units in the top or magazine storage section are simultaneously pushed forward. The front carriage then lowers the unit into display position and means are provided for spreading the unit to give the three dimensional effect. The cycle of movement is then repeated. Ordinarily a plurality of such units are contained in the machine, and in a size of machine in use, five such units are provided and they are distributed throughout the machine at various stages of operation. The machine could be easily alterd to accommodate more or less than five display units. Thereby a continual display of series of units is obtained.

In the accompanying drawings constituting a part hereof, in which like reference characters indicate like parts, Fig. 1 is a front elevational view of a device made in accordance with the present invention and showing a display unit in position for exhibiting;

Fig. 2 is a side elevational view of the present invention illustrating particularly a cam arrangement and associated elements, and means for operating the machine as a whole;

Figure 2a is a fragmentary side elevational view of a modification of the pusher element of Figure 2;

Fig. 3 is a view similar to Fig. 2 but taken from the opposite side of the machine;

Fig. 4 is a top plan view of the machine, showing particularly the upper track and elements associated therewith;

Fig. 5 is a horizontal cross-sectional view taken along the line 5—5 of Fig. 2 and illustrating particularly the lower track of elements associated therewith;

Fig. 6 is a fragmentary side elevational view somewhat enlarged and showing the mechanism for pushing display units forward on the upper track;

Fig. 7 is a view similar to Fig. 6, illustrating particularly the mechanism for moving display units rearwardly on the lower track;

Fig. 8 is a side elevational view similar to Fig. 2, with numerous parts omitted, to more clearly illustrate the operation of the mechanism;

Fig. 9 is a fragmentary front elevational view of a corner of a display unit, positioned relative to the upper track;

Fig. 10 is a fragmentary top plan view of a corner of display unit and its association with other parts of the mechanism;

Fig. 11 is a view similar to Fig. 9, showing a display unit on the lower track and in conjunction with the wedge spreader;

Fig. 12 is a top plan view of a display unit, separate from the rest of the mechanism, and Figs. 13, 14 and 15 are front elevational views of each of the plates detached from the display unit.

With particular reference to Figs. 12 to 15, the display unit 1 consists of a set of rectangular plates 2, 3 and 4, of transparent material. Each of the plates has decorative effects thereon, plate 2 showing the foreground of a landscape, plate 3 showing the background, and plate 4 showing the sky. When united into the unit, three dimensional effects are obtained by placing the plates in parallel relation. Each of the plates is provided with a frame 5 and plates 2 and 3 are linked together by links 6. Plates 3 and 4 are linked together by links 7. Grooved extensions 8 on both sides of each of the plates provide means for resting on the lower tracks described below. Flat portions 9 and 10 on plates 2 and 4 provide means for contact with a wedge described below. Grooved extensions 11 on plate 3 provide means for the insertion of lugs described below. Also, on plate 3, and outside of extensions 11 are flat surfaces 12 to accommodate the top track described below and grooved extensions 13 beyond portions 12 provide means for lateral transfer of the unit on the lower track.

The mechanism includes a frame consisting of fabricated side members 15 and 16 in parallel relation and united by cross members so as to give a rigid structure. The various mechanisms are mounted on said frame. A reduction gearing 17 is connected to a suitable source of power and it drives a chain 18 meshing with gear 19. Shaft 21 on which gear 20 is mounted extends across the front of the frame and carries at its sides a pair of gears 22. At the top of the frame in the front thereof are corresponding gears 23 mounted on shaft 24. A pair of chains 26 having spaced lugs 25 secured thereto pass over pulleys 22 and 23. Lugs 25 serve as means for lowering units from the upper to the lower track.

Shaft 27 extending across the rear of the frame and having gear 19 mounted thereon is provided with a pair of gears 28 along the sides of the frame. Directly above the same are mounted a pair of gears 29 on a shaft 29'. A pair of chains 30 are mounted on gears 28 and 29 and carry lugs 31 which operate to raise display units from the lower to the upper track.

A gear 32 mounted on shaft 21 meshes with a larger gear 33 carrying a pinion 34. A chain 35 therefrom meshes with gear 36 mounted at an intermediate point on the frame. An idler 37 is provided to give proper tension in chains 35. Gear 36 is mounted on shaft 38 which also carries a pair of cams 39 and 40.

Contacting with cam 39 is follower 41 mounted on angular lever 43 which is pivoted to the frame at 42. At the free end of lever 43 is a cord 44 extending to a roller on pulley 45, the end 46 thereof being fixed to said pulley. The latter is mounted on shaft 47, which also carries double grooved wheel 48. A curtain 49 is suspended from said wheel by cord 50' in one of said grooves. Curtain 49 is adapted to move in guides 49' at the front of the machine. A counterweight 50 is suspended from cord 50', which fits into the other groove of wheel 48.

Link 51 pivoted at an intermediate point in lever 43 connects to the end of lever 52, pivoted on the frame at 53. At the top of lever 51 is pivoted a pusher 54 adapted to move adjacent to the upper track 55.

Contacting with cam 40 is follower 56 mounted on the end of angular lever 57 which is pivoted to the frame at an intermediate point. At the free end thereof is a link 58 connected to pusher lever 59, the lower end of which is mounted on the frame at 60. The upper end 61 of lever 59 acts as a pusher for moving units rearwardly on the lower track.

As more particularly shown in Figs. 7 and 8, a mechanism is provided for spreading the plates of each display unit. As a unit is moved downwardly from the upper track 55 to lower track 62, the unit is in folded position. A wedge-like member is provided in order to spread the same before it actually touches track 62. There is provided a wedge 63 pointing upwardly and in alignment with plate 3' of the display unit. It has a depending extension 64 which acts as a slide and moves in guide 65. Plate 66 attached to 64 has a link 67 pivoted therein cooperating with another link 68 at a common pivot point 69. The lower end of link 68 is pivoted in fixed support 70. Also pivoted at 69 is a horizintal bar 71 bearing a stop member 72. The free end of bar 71 is pivotally connected to a link 73 which is suspended from track 62. Pin 74 fixed in lever 59 is adapted to contact with stop 72 and a spring 75 tends to pull lever 59 to the left.

In the position shown in Fig. 7, lever 59 is in retracted position, display unit 3' is just reaching wedge 63 and unit 3 is about to be engaged by a lug on chain 30 to be lifted. Due to the operation of the cam mechanism, at this point lever 59 is moved to the left relatively rapidly while unit 3' is being spread and the outer plates of which have already contacted with track 62. Pin 74 connects stop 72 breaking the toggle and placing it in the position shown in Fig. 8. This retracts wedge 63 and allows the complete spreading of unit 3' into the position shown in Fig. 8. It may then be displayed.

In Fig. 2-a there is shown a modification of pusher element of Fig. 2. Pusher 54 in its operation contacts with the right hand display unit and moves the same to the left so that said unit will engage all the other units on track 55 and push the left hand unit in proper position for lowering by lug 25. In Fig. 2-a a modification is shown wherein each of the units on track 55 are separately engaged. The lever 52 is normally in a vertical position when it is ready for an operation and it bears a link 54' which has a longitudinal slot 76 therein. This embraces a pin 77 held in pusher 78. The latter is a horizontal bar having on the under side thereof a series of recesses 79 corresponding to the number of units on track 55. Each of the recesses is provided with an inclined forward face 80. In operation, the lever 52 moves to the right so that the recesses 79 are in positions above the display units, whereupon they drop in place over the ends of said units. Upon the operation of the cam to move lever 52 to the left, there is some lost motion due to slot 76, and then plate 78 is pulled so that it pushes all of the units simultaneously into the forward position so that the front unit is transferred to lug 25. This occurs in a very short period of time so that the right hand unit is pulled off of lug 31 before it moves above track 55. This timing insures that there would be no interruption in the cycle.

There may also be provided in link 51 a slot 81 so that during the operation of the cam some lost motion will be provided. This allows the cam to start the movement of the curtain before the pusher 78 begins to move the units. Therefore such motion takes place behind a closed curtain and no interference with the viewing of the exhibit by the spectator is caused.

Although the invention has been described setting forth a single embodiment thereof, it will be apparent to those skilled in the art that many variations in the details of construction are possible within the principles set forth herein. It is essential for the present invention that there be a cycle of movement of each of the display units in coordination with every other display unit in the machine. Each unit moves through a rectangular cycle being displayed at the bottom of the front leg of the rectangle. Each unit is in collapsed position except during the period of exhibition and movement rearwardly at the lower leg of the rectangle.

In the description the movement of one of the units has been specifically described. It is to be understood that the other units move consecutively in the same manner and that such movements are continual and give an endless cycle. In the drawings, a certain number of units have been shown but such units are only for purposes of illustration. More or less units may be introduced and some slight changes in the mechanism may be necessary for this purpose. It may be desirable to increase the length of the tracks or decrease the same to accommodate more or less of the display units. Various sizes and shapes of frames may constitute each display unit. In such case, it may be necessary to make the machine wider or narrower but this is a simple matter as the mechanisms are contained on the side frames and would not be disturbed by such changes. The time cycle of operation may be varied at will and the various functions may be speeded up or slowed down to accommodate different conditions of exhibition. To accomplish this only a very simple change is necessary in that very simple forms of cams are used in place of cams 39 and 40.

The display units being exhibited may be lighted, in order to emphasize the displays. Lighting may be introduced into the bottom of the machine and a single lighting unit may be used to light up all of the elements of a single display unit, or separate lights may be used for each of the frames of a unit or any combination of units. The lights may be of different colors or there may be changeable colors in a single exhibition of a unit. The lights may remain on continuously or they may be controlled to go on and off or to brighten or to become dimmed at various intervals. Such effects may be obtained by the use of a rotary or other switch or a cam arrangement and may be timed in tune with cams 39 and 40.

The several parts may be produced from any materials of suitable strength and having the other necessary properties. They may be formed by stamping, casting, and fabricating; and various elements may be joined by welding, brazing, riveting, and the like. The rotating parts may be provided with means for minimizing friction, such as needle or other suitable bearings. Also, light metals and plastic materials may be used to decrease wear and to economize on the power for operating the machine.

The number of frames in a single display unit may be varied, say from 2 to 5. A back scene may be fixed to, in spaced relation with the rear frame of a display unit, and it may retain its position when the unit is collapsed or it may fold with the unit. The sets of tracks may be inclined so that the action of gravity may assist the mechanical elements in moving the units during the cycle, and thereby render the operations easier, smoother and more accurate. Safety devices may be incorporated in the machine, as for example, micro-switches may be inserted at various points, so that if a moving element, such as a display unit, moves out of its intended relationship, power may be cut off and damage to the mechanism avoided.

The rectangular cyclic movement may be reversed and the units may move forwardly on the lower track, and the claims are intended by their wording to include such a reversed cycle. And the display may be at the upper part of the machine instead of at the lower portion.

These and other changes may be made within the principles herein set forth, and the invention is to be broadly construed and not to be limited except by the character of the claims appended hereto.

We claim:

1. A display device comprising a frame, a plurality of display units, each of said units constituting a display, a horizontal track at the top of said frame, means for moving forwardly a display on said track, a vertically movable carriage for lowering said display, a lower horizontal track on said frame, means for depositing said display on said lower track, means for exhibiting the same, means for moving said display rearwardly on said lower track, and a vertically movable carriage for raising said display and depositing the same on said upper track, a pair of cams mounted on said frame for rotation in unison, means operated by one of said cams for moving said display on one of said tracks and means operated by the other cam for moving said display on the other track.

2. A display device comprising a frame, a plurality of display units, each of said units constituting a display, a horizontal track at the top of said frame, means for moving forwardly a display on said track, a vertically movable carriage for lowering said display, a lower horizontal track on said frame, means for depositing said display on said lower track, means for exhibiting the same, means for moving said display rearwardly on said lower track, and a vertically movable carriage for raising said display and depositing the same on said upper track, each of said units having at least two parallel plates interlinked at one edge thereof so as to permit spreading apart thereof in parallel relation at the area where said display is exhibited.

3. A display device comprising a frame, a plurality of display units, each of said units constituting a display, a horizontal track at the top of said frame, means for moving forwardly a display on said track, a vertically movable carriage for lowering said display, a lower horizontal track on said frame, means for depositing said display on said lower track, means for exhibiting the same, means for moving said display rearwardly on said lower track, and a vertically movable carriage for raising said display and depositing the same on said upper track, each of said units having at least two plates interlinked so as to permit spreading thereof at the area where said display is exhibited, a wedge at said lower track, and means for raising the same into a position between said plates to spread said plates apart as said display approaches said lower track.

4. A display device comprising a frame, a plurality of display units, each of said units constituting a display, a horizontal track at the top of said frame, means for moving forwardly a display on said track, a vertically movable carriage for lowering said display, a lower horizontal track on said frame, means for depositing said display on said lower track, means for exhibiting the same, means for moving said display rearwardly on said lower track, and a vertically movable carriage for raising said display and depositing the same on said upper track, each of said units having at least two plates interlinked so as to permit spreading thereof at the area where said display is exhibited, a wedge at said lower track, and means for raising the same into a position between said plates to spread said plates apart as said display approaches said lower track, and a slider lever at said lower track adapted to contact said spread display and move the same rearwardly.

5. A display device comprising a frame, a plurality of display units, each of said units constituting a display, a horizontal track at the top of said frame, means for moving forwardly a display on said track, a vertically movable carriage for lowering said display, a lower horizontal track on said frame, means for depositing said display on said lower track, means for exhibiting the same, means for moving said display rearwardly on said lower track, and a vertically movable carriage for raising said display and depositing the same on said upper track, each of said units having at least two plates interlinked so as to permit spreading thereof at the area where said display is exhibited, a wedge at said lower track, and means for raising the same into a position between said plates to spread said plates apart as said display approaches said lower track, and a slider lever at said lower track adapted to contact said spread display and move the same rearwardly, said raising carriage having at least one lug thereon adapted to support one of said spread plates to raise said display and permit said plates to approach each other.

6. A display device comprising a frame, a plurality of display units, each of said units constituting a display, a horizontal track at the top of said frame, means for moving forwardly a display on said track, a vertically movable carriage for lowering said display, a lower horizontal track on said frame, means for depositing said display on said lower track, means for exhibiting the same, means for moving said display rearwardly on said lower track, and a vertically movable carriage for raising said display and depositing the same on said upper track, each of said units having three parallel plates pivotally interconnected, the center plate having extensions thereon adapted to ride on said tracks.

HENRY M. RILEY.
AUGUST HUETHER.

References Cited in the file of this patent

UNITED STATES PATENTS

| Number | Name | Date |
|---|---|---|
| 729,843 | Carr | June 2, 1903 |
| 873,471 | Viger | Dec. 10, 1907 |
| 1,057,197 | Wilson | Mar. 25, 1913 |
| 2,141,514 | Carre et al. | Dec. 27, 1938 |
| 2,449,825 | Strauss | Sept. 21, 1948 |